USO10060358B2

(12) United States Patent
Tiwari et al.

(10) Patent No.: US 10,060,358 B2
(45) Date of Patent: Aug. 28, 2018

(54) COMPRESSOR BLEED VALVE HEALTH ASSESSMENT SYSTEMS AND METHODS

(71) Applicant: General Electric Company, Schenectady, NY (US)

(72) Inventors: Awadesh Kumar Tiwari, Bangalore (IN); Aditi Koppikar, Bangalore (IN); Jerome Lefin, Belfort (FR); Nimmy Paulose, Bangalore (IN); James Vanwormer, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/132,782

(22) Filed: Apr. 19, 2016

(65) Prior Publication Data

US 2017/0298836 A1   Oct. 19, 2017

(51) Int. Cl.
  *F02C 9/18* (2006.01)
  *F01D 17/10* (2006.01)
  *F01D 21/00* (2006.01)
  *F02C 9/46* (2006.01)

(52) U.S. Cl.
  CPC .............. *F02C 9/18* (2013.01); *F01D 17/105* (2013.01); *F01D 21/003* (2013.01); *F02C 9/46* (2013.01);
  (Continued)

(58) Field of Classification Search
  CPC .. F02C 9/18; F02C 9/46; F01D 21/003; F05D 2270/709; F05D 2270/54; F05D 2270/44;
  (Continued)

(56) References Cited

U.S. PATENT DOCUMENTS 5,313,778 A    5/1994  Sweet et al.
7,328,098 B1   2/2008  VanderLeest et al.
(Continued)

FOREIGN PATENT DOCUMENTS

WO    WO-2012084453 A1 *  6/2012  ............ F01D 17/085

OTHER PUBLICATIONS

N. Meskin, E. Naderi, and K. Khorasani, A Multiple Model-Based Approach for Fault Diagnosis of Jet Engines, IEEE Transactions on Control Systems Technology, vol. 21, No. 1, Jan. 2013, p. 254-262 (Year: 2013).*

*Primary Examiner* — Jeffrey C Boomer
(74) *Attorney, Agent, or Firm* — Eversheds-Sutherland (US)

(57) ABSTRACT

In one example embodiment, a gas turbine system includes a gas turbine, a compressor bleed valve, various sensors, and a valve health assessment system. The compressor bleed valve bleeds a portion of air received by the compressor during certain operating modes. The valve health assessment system includes a processor that uses a neural network model to generate a first failure mode predictor of the compressor bleed valve by processing operational data provided by the various sensors. The processor also generates a second failure mode predictor of the compressor bleed valve by using empirical data and a valve transfer function. The processor further generates a third failure mode predictor of the compressor bleed valve by using predictive data and a prediction model. The processor then applies a holistic procedure to the three failure mode predictors to derive a probability of occurrence of a failure in the compressor bleed valve.

5 Claims, 4 Drawing Sheets

(52) U.S. Cl.
CPC ...... *F05D 2220/32* (2013.01); *F05D 2260/80* (2013.01); *F05D 2260/81* (2013.01); *F05D 2270/11* (2013.01); *F05D 2270/301* (2013.01); *F05D 2270/303* (2013.01); *F05D 2270/3061* (2013.01); *F05D 2270/44* (2013.01); *F05D 2270/54* (2013.01); *F05D 2270/709* (2013.01); *F05D 2270/71* (2013.01)

(58) Field of Classification Search
CPC ......... F05D 2270/3061; F05D 2270/71; F05D 2270/301; F05D 2270/11; F05D 2260/81; F05D 2220/32; F05D 2270/303
See application file for complete search history.

(56) References Cited

U.S. PATENT DOCUMENTS

| | | | |
|---|---|---|---|
| 2002/0139180 A1* | 10/2002 | Xiong | F01D 17/105 73/112.05 |
| 2011/0040470 A1* | 2/2011 | Qiu | F01D 19/00 701/100 |
| 2013/0131951 A1* | 5/2013 | Pandey | F02C 9/00 701/100 |
| 2013/0238256 A1* | 9/2013 | Anup | G05B 23/0283 702/34 |
| 2015/0106058 A1* | 4/2015 | Mazzaro | G01M 99/005 702/181 |
| 2017/0101956 A1* | 4/2017 | Younkins | F02D 41/221 |
| 2017/0102148 A1* | 4/2017 | Olsen | F23R 3/42 |
| 2017/0242081 A1* | 8/2017 | Kemp, Jr. | G01R 31/40 |

* cited by examiner

COMPRESSOR BLEED VALVE HEALTH ASSESSMENT SYSTEMS AND METHODS

FIELD OF THE DISCLOSURE

This disclosure relates to systems and methods for assessing the health status of a compressor bleed valve that is a part of a gas turbine.

BACKGROUND OF THE DISCLOSURE

A gas turbine is a complex piece of machinery that generally requires continuous monitoring and maintenance in order to avoid expensive repair, particularly as a result of a breakdown during operation. One a component in a gas turbine is a compressor bleed valve (CBV). The CBV is used to redirect compressed air flow in the gas turbine during certain operating modes to ensure that the gas turbine operates at a relatively high level of efficiency. Understandably, failure or a malfunctioning of the CBV can lead to poor operational efficiency or stoppage of the gas turbine, both of which can be expensive in terms of lost revenue and repair costs. Consequently, most gas turbines incorporate monitoring systems that continuously monitor the gas turbine when in operation and provide a warning upon detecting an abnormal condition. However, these monitoring systems generally operate in a reactive manner and provide the warning only after a fault condition has occurred. The fault condition may then be addressed by carrying out suitable repair. As can be appreciated, such repair can be time-consuming and expensive, particularly when the gas turbine is shut down as a result of the fault condition.

BRIEF DESCRIPTION OF THE DISCLOSURE

Certain embodiments of the disclosure can provide a technical effect and/or solution for generating a health status of a compressor bleed valve associated with a gas turbine. The health status can provide an indication of a predicted failure or malfunction of the compressor bleed valve. Alternatively, or in conjunction with generation of the health status, an advisory can be displayed on a graphical user interface that enables an operator to improve a performance of the gas turbine, for example, by carrying out maintenance work or pre-emptive remedial action upon the compressor bleed valve and/or other components of the gas turbine.

According to one exemplary embodiment of the disclosure, a method includes receiving in a processor, from at least one sensor, operational data associated with at least one component of a gas turbine. A first failure mode predictor of a compressor bleed valve can be generated based at least in part on the operational data. A second failure mode predictor of the compressor bleed valve can be generated based at least in part on modeling at least one state of the compressor bleed valve under at least one operating condition. A third failure mode predictor of the compressor bleed valve can be generated based at least in part on a probability of occurrence of at least one failure mode of the compressor bleed valve. A control signal can be generated by executing a decision tree procedure that is based at least in part on the first failure mode predictor, the second failure mode predictor, and the third failure mode predictor. The control signal can be transmitted to a controller, the control signal operable to modify an operation of at least one component of the gas turbine.

According to another exemplary embodiment of the disclosure, a valve health assessment system includes a memory containing computer-executable instructions and a processor configured to access the memory and execute computer-executable instructions to at least receive from at least one sensor, operational data associated with at least one component of a gas turbine, wherein the gas turbine comprises a compressor and a compressor bleed valve. A first failure mode predictor of the compressor bleed valve can be generated based at least in part on the operational data received from the at least one sensor. A second failure mode predictor of the compressor bleed valve can be generated based at least in part on modeling at least one state of the compressor bleed valve under at least one operating condition. A third failure mode predictor of the compressor bleed valve can be generated based at least in part on a probability of occurrence of at least one failure mode of the compressor bleed valve. A health status of the compressor bleed valve can be generated based at least in part on the first failure mode predictor, the second failure mode predictor, and the third failure mode predictor.

According to yet another exemplary embodiment of the disclosure, a gas turbine system includes a gas turbine, a compressor bleed valve, at least one sensor, and a valve health assessment system. The gas turbine is configured to drive a compressor for compressing air received from an air intake port. The compressor bleed valve is configured to bleed a portion of the air received by the compressor during one or more operating modes of the gas turbine system. The at least one sensor is configured to provide operational data associated with at least one of the gas turbine, the compressor, or the compressor bleed valve. The valve health assessment system includes a processor that can use a neural network model to generate a first failure mode predictor of the compressor bleed valve by processing the operational data received from the at least one sensor. The processor can also generate a second failure mode predictor of the compressor bleed valve by using a valve transfer function, the valve transfer function modeling at least one state of the compressor bleed valve under at least one operating condition. The processor can further generate a third failure mode predictor of the compressor bleed valve by using a prediction model that is indicative of a probability of occurrence of at least one failure mode of the compressor bleed valve. The processor can generate a health status of the compressor bleed valve by executing a decision tree procedure that is based at least in part on the first failure mode predictor, the second failure mode predictor, and the third failure mode predictor.

Other embodiments and aspects of the disclosure will become apparent from the following description taken in conjunction with the following drawings.

BRIEF DESCRIPTION OF THE DRAWINGS

Figure 1:
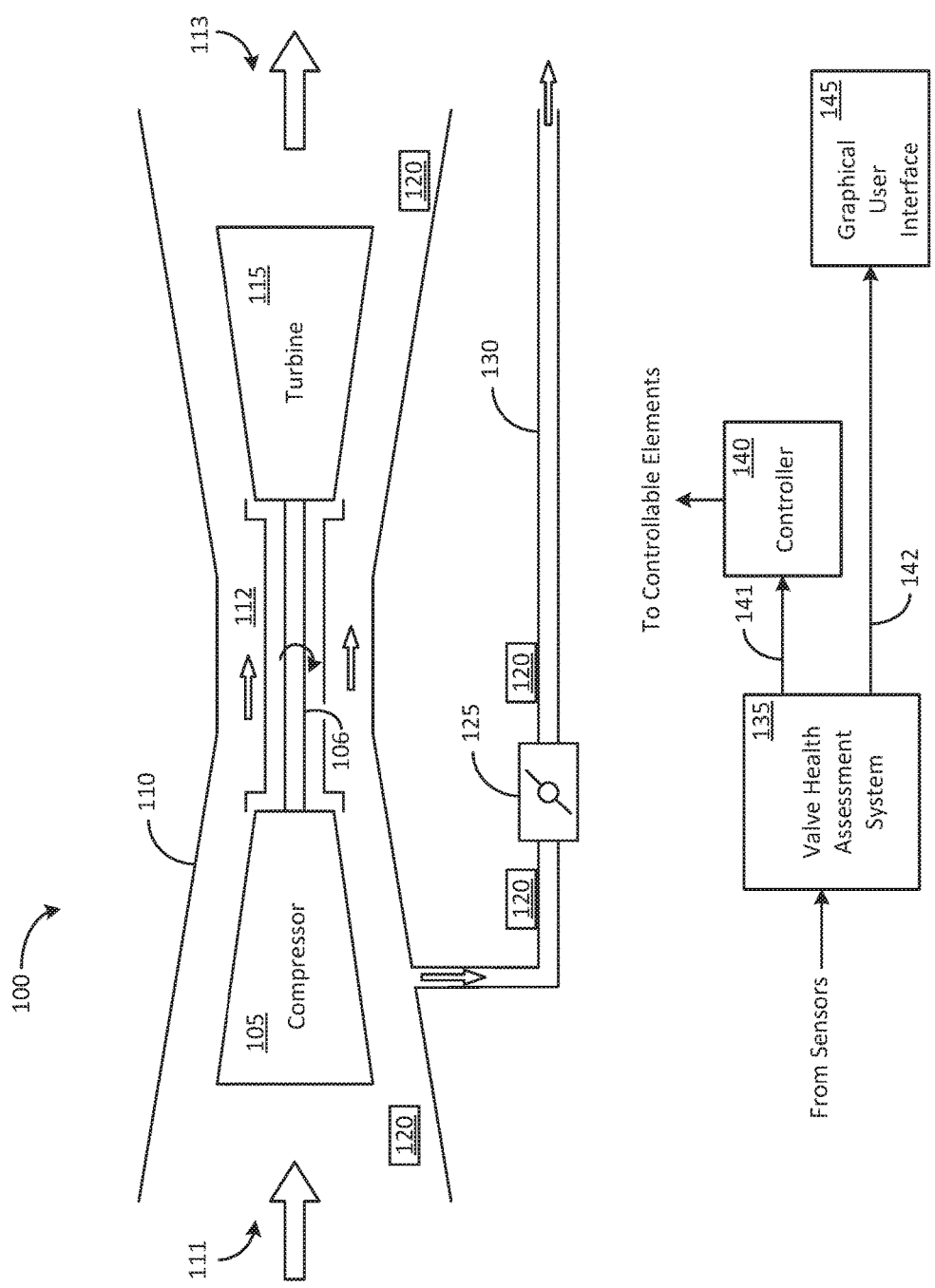

Having thus described the disclosure in general terms, reference will now be made to the accompanying drawings, which are not necessarily drawn to scale, and wherein:

FIG. 1 illustrates an example gas turbine system incorporating a valve health assessment system in accordance with an exemplary embodiment of the disclosure.

Figure 2:
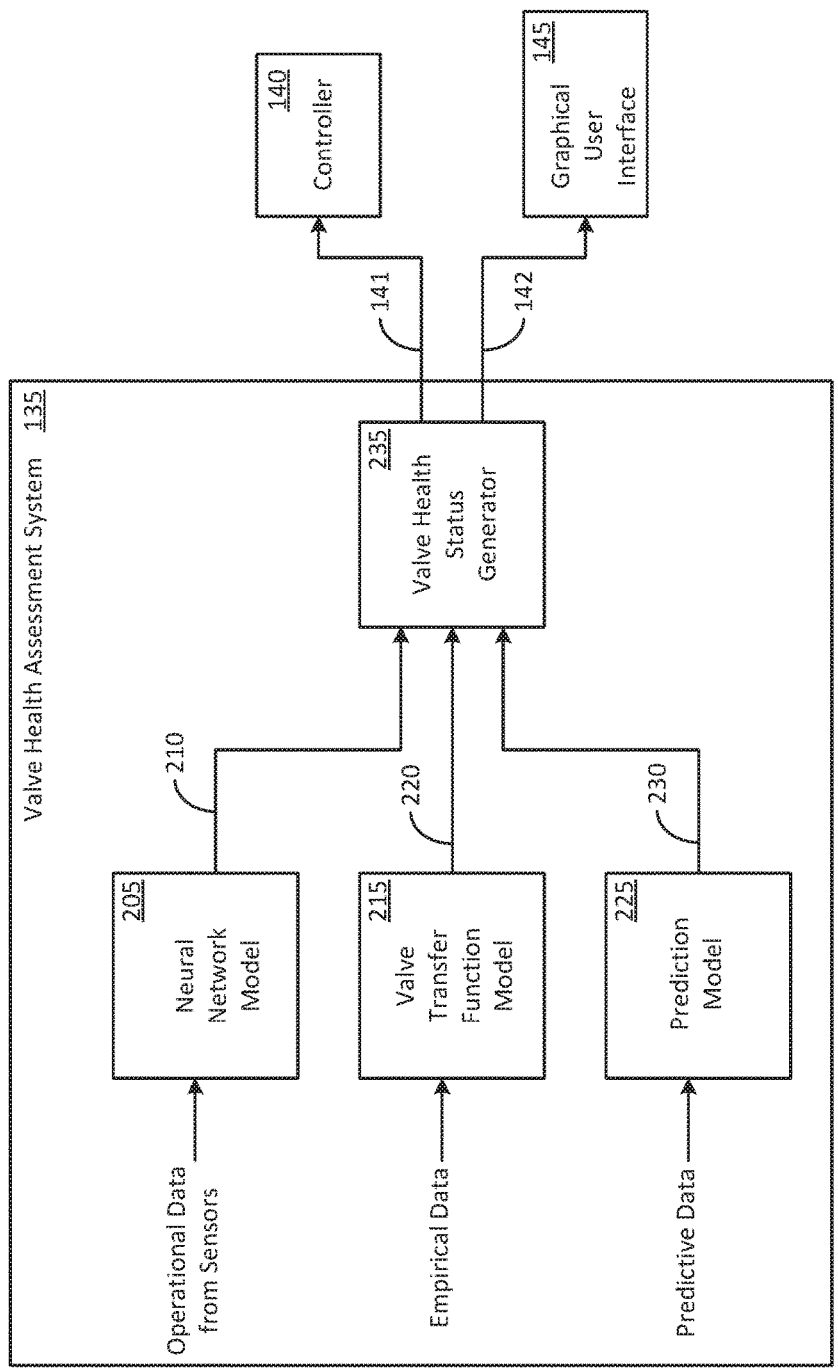

FIG. 2 illustrates some exemplary components of a valve health assessment system in accordance with an exemplary embodiment of the disclosure.

Figure 3:
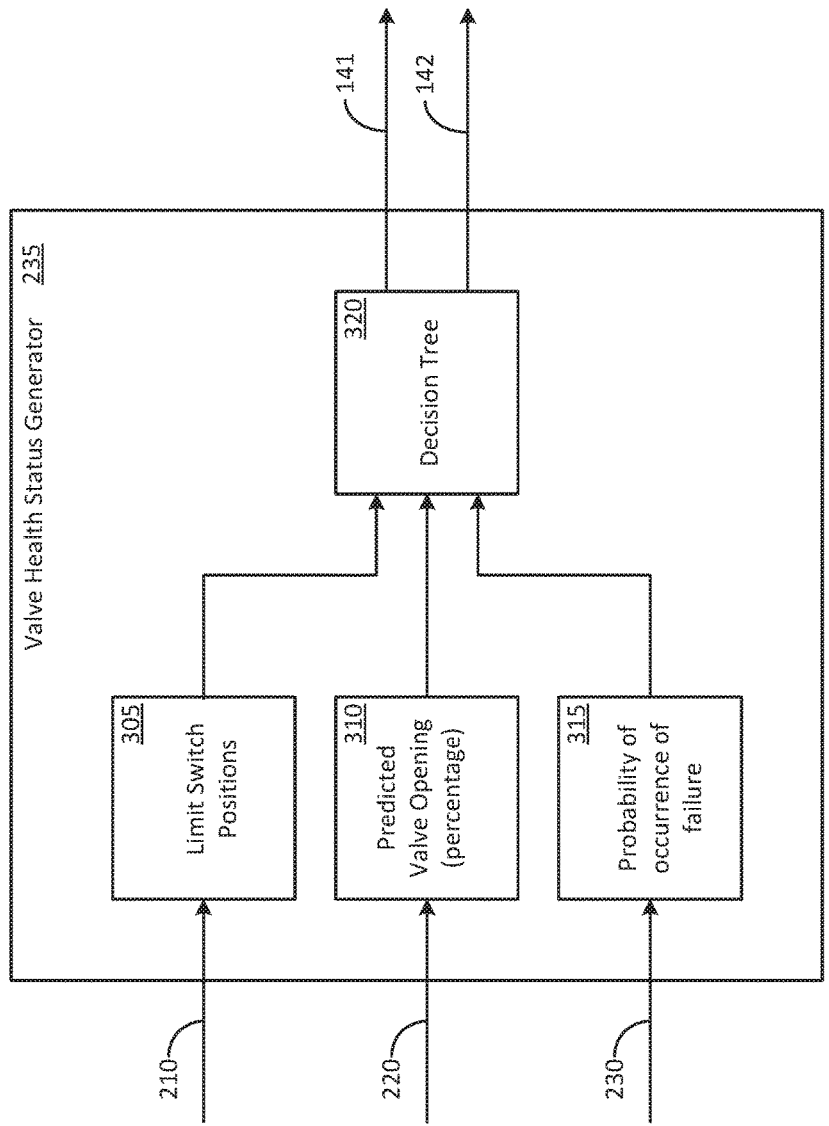

FIG. 3 illustrates some exemplary components of a valve health status generator that can be a part of the exemplary valve health assessment system shown in FIG. 2.

Figure 4:
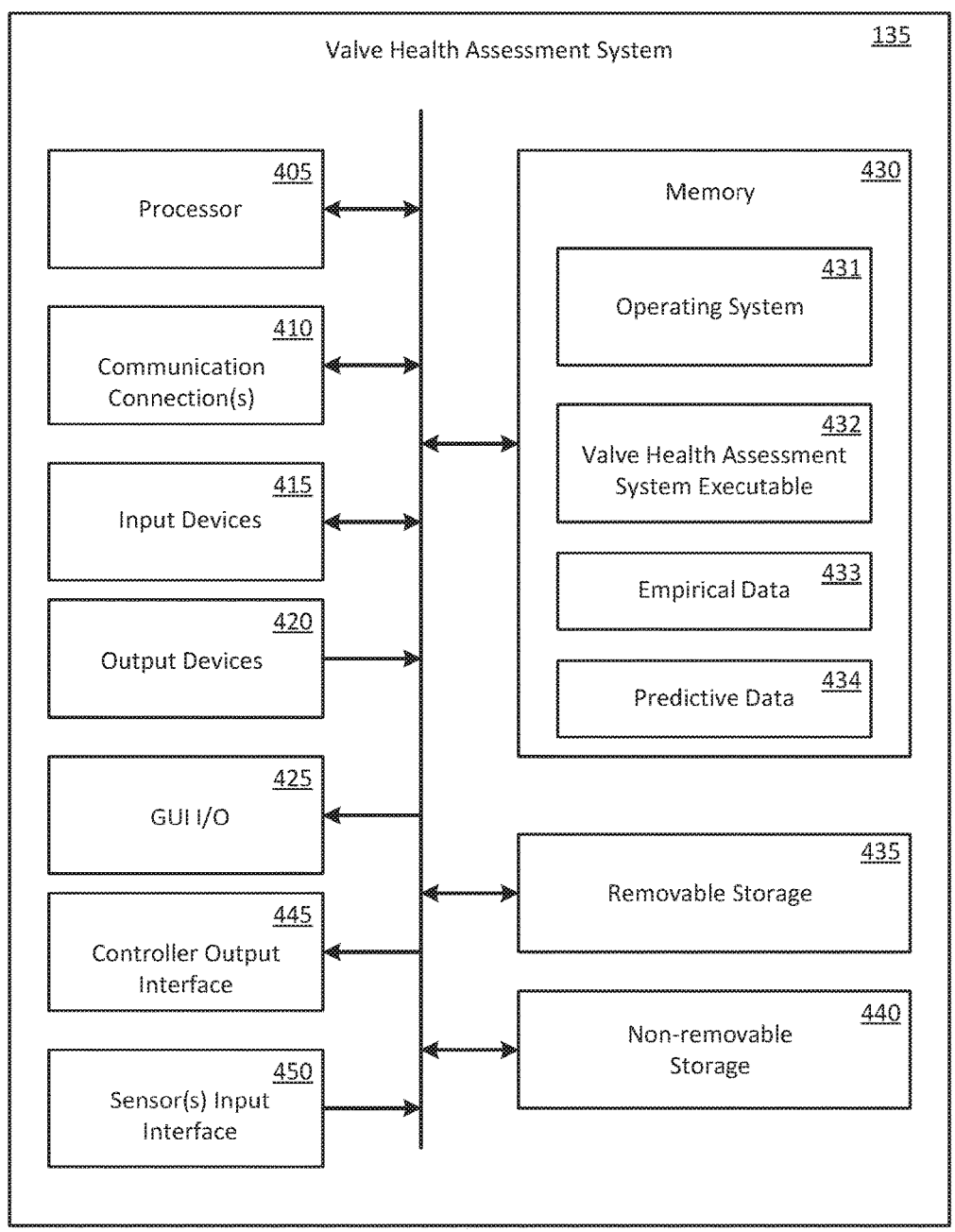

FIG. 4 shows some exemplary components of another valve health assessment system in accordance with another exemplary embodiment of the disclosure.

DETAILED DESCRIPTION OF THE DISCLOSURE

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein; rather, these embodiments are provided so that this disclosure will satisfy applicable legal requirements. Like numbers refer to like elements throughout. It should be understood that certain words and terms are used herein solely for convenience and such words and terms should be interpreted as referring to various objects and actions that are generally understood in various forms and equivalencies by persons of ordinary skill in the art. For example, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described. Furthermore, though the exemplary embodiments described herein may refer to a compressor bleed valve, it should be understood that the systems and methods can be equally applicable to various other valves in a gas turbine as well as in other machinery.

Attention is first drawn to FIG. 1, which illustrates an example gas turbine system 100 incorporating a valve health assessment system 135 in accordance with an exemplary embodiment of the disclosure. Gas turbine system 100 includes a turbine housing 110 in which is housed a compressor 105 that is coupled via a rotary shaft 106 to a turbine 115. The turbine housing 110 further includes a combustion chamber 112 in which fuel is burnt. The compressor 105 draws in air from an air intake port 111 and feeds the air at high pressure into the combustion chamber 112, thus increasing the intensity of the fuel that is burnt in the combustion chamber 112. The air from the combustion chamber 112 causes a rotation of turbine rotors (not shown) in the turbine 115 before exiting from the turbine housing 110 via an exhaust port 113. As the turbine rotors gather speed due to the air flow, the compressor 105 is also compelled to speed up due to the coupling of the turbine 115 to the compressor 105 via the rotary shaft 106. The speed-up of the compressor 105 forces even more air into the combustion chamber 112, which in turn results in an increase in the burn rate of the fuel in the combustion chamber 112 and a further increase in the speed of rotation of the turbine rotors. However, uncontrolled runaway is minimized by using various mechanisms, such as, actuating one or control elements of a fuel supply line (not shown) to limit the amount of fuel fed into the combustion chamber 112.

The amount of air entering the combustion chamber 112 can also be controlled by bleeding a portion of the air out of the turbine housing 110 via a bypass air path 130. Typically, the amount of air that is bled out of the turbine housing 110 via the bypass air path 130 is controllable by using a compressor bleed valve (CBV) 125. When the CBV 125 is in a closed position, a minimal amount of air (or no air) is bled out of the turbine housing 110 via the bypass air path 130. On the other hand, a controlled quantity of air can be bled out by placing the CBV 125 in a partially open position or a fully open position.

When the gas turbine system 100 is in operation, the CBV 125 is activated quite frequently, thus leading to wear and tear on various parts of the CBV 125. In some situations, a failure of the CBV 125 can necessitate a complete shutdown of the gas turbine system 100. Consequently, in traditional gas turbine systems, a monitoring apparatus is used to monitor the compressor bleed valve and provide an alarm when a failure occurs in the compressor bleed valve. The alarm is generally provided only after a failure has occurred in the compressor bleed valve. Furthermore, the alarm only provides a binary pass/fail indication that does not allow for showing warnings prior to the failure. Certain embodiments of the disclosure can operate in a pre-emptive manner and provide an indication of an impending failure so as to allow pre-emptive remedial action to be taken prior to the occurrence of the failure. The indication can be provided in a non-binary format such as a gradation measure or a comparative measure for example.

Towards this end, and in accordance with an exemplary implementation of the disclosure, a valve health assessment system 135 is used to monitor the gas turbine system 100 and generate a health status of the CBV 125 and/or other components of the gas turbine system 100. The valve health assessment system 135 is communicatively coupled to the CBV 125 and to other parts of the gas turbine system 100 such as one or more sensors 120. The one or more sensors 120, which can be a variety of sensors such as a temperature sensor, an air pressure sensor, a chemical sensor, or a contaminant level sensor, are placed at various locations on the gas turbine system 100 such as in the proximity of the air intake port 111, the exhaust port 113, the bypass air path 130, and/or in the CBV 125.

The valve health assessment system 135 uses operational data (temperature data, pressure data, contamination level data etc.) obtained from the various sensors 120 and processes this data in combination with certain other types of data (described below) to generate a health status of the CBV 125 and/or other components of the gas turbine system 100. In the exemplary embodiment shown in FIG. 1, the health status can be provided to a controller 140 via a line 141. The controller 140 can use the health status to generate one or more control signals that can be provided to the CBV 125 and/or to one or more controllable elements (not shown) such as an airflow control element, a temperature control element, a fuel supply control element, or a fluid flow control element. The controller 140 can also use the health status to generate one or more other signals such as a display signal for driving a graphical user interface (GUI) 145 that displays various types of health status messages.

Some exemplary health status messages that are displayed on the GUI 145 can indicate to an operator (not shown) that the CBV 125 is providing an "average" level of performance, a "below average" level of performance, an "acceptable" level of performance, or an "unacceptable" level of performance (i.e. in a non-binary format). One or more of the health status message may further indicate a cause for say, the "below average" level of performance or the "unacceptable" level of performance of the CBV 125. The indicated cause can be, for example, an excessive level of contamination in one or more parts of the CBV 125. Upon viewing the health status message, the operator may appropriately address the issue by say, initiating a remedial cleaning procedure (water flush, air flush etc.). The remedial cleaning procedure can improve a current performance level of the gas turbine system 100 and may also minimize or mitigate a failure of the CBV 125 and/or other parts of the gas turbine 100.

In another example implementation, the displayed health status message can be a first advisory that alerts an operator of the GUI 145 of an impending catastrophic failure that could lead to a shutdown of the gas turbine system 100, and/or a second advisory that alerts the operator of a minor failure that is causing (or can cause) a deterioration in performance of the gas turbine system 100. Data pertaining to the various health status messages can be displayed on the GUI 145 in an analytics data format such as a trend chart, probability parameters, a contamination level, a slowed response characteristic of a component, a seizure characteristic of a component, an abnormal state of a component, etc. A few examples of probability parameters can include a probability of a valve having a change in speed of operation, a probability of reaching a contamination threshold, and a probability of a valve reaching a sticking condition. The health status messages can also be displayed in the form of real-time graphics, for example, real-time graphics that are indicative of operating values related to time, trends, cumulative values, or variations from normal. Upon viewing these types of health status messages, the operator may initiate remedial actions such as replacing one or more components of the gas turbine system 100, placing an order for replacement parts, bringing it to the attention of management, recommending warranty work to be carried out, recommending modification of terms of a service contract, or updating inventory.

Attention is next drawn to FIG. 2, which shows some exemplary components of a valve health assessment system 135 in accordance with an exemplary embodiment of the disclosure. The exemplary components are shown in the form of functional blocks that can be implemented in various ways, such as in the form of a hardware, software, firmware, or in various combinations thereof. As indicated above, the valve health assessment system 135 uses operational data (temperature data, pressure data, contamination level data etc.) obtained from the various sensors 120 and processes this data in combination with certain other types of data to generate a health status of the CBV 125 and/or other components of the gas turbine system 100.

Specifically, operational data obtained from the various sensors 120 (shown in FIG. 1) is provided to a neural network model 205. A few examples of operational data provided to the neural network model 205 can include, but are not limited to, compressor inlet temperature, compressor inlet pressure, compressor pressure difference, gas turbine power output, compressor effective degradation, gas turbine fuel stroke ratio, gas turbine speed, gas turbine generator open/close command, gas turbine exhaust temperature, gas turbine trip signal, compressor wheel space temperature, and gas turbine rotor vibration. The operational data provided by the various sensors is processed using the neural network model 205 to obtain a first set of one or more potential failure predictors. With specific reference to the CBV 125, the first set of one or more potential failure predictors can be defined, for example, in the form of a valve opening status. In one example implementation, the valve opening status can be specified in the form of a percentage value. Thus, at any given instant, when the valve health assessment system 135 is being executed in real-time, the valve opening status of the CBV 125 can be specified, for example, as being 10% open, 50% open, 90% open etc. Alternatively, the valve opening status of the CBV 125 can be specified as 10% closed, 50% closed, 90% closed etc. Furthermore, in some example implementations, the valve opening status of the CBV 125 can be specified as being 0% open to reflect a fully closed status, and can be specified as being 0% closed to reflect a fully open status. Irrespective of the manner in which defined, the first set of one or more potential failure predictors generated by the neural network model 205 operates as a first input to a valve health status generator 235.

A second set of one or more potential failure predictors is provided to the valve health status generator 235 by using a valve transfer function model 215 to process empirical data. The empirical data can be, for example, statistical data and/or historical data pertaining to various parameters associated with the gas turbine system 100. Such parameters can include, but are not limited to, compressor inlet temperature, compressor inlet pressure, compressor pressure difference, gas turbine power output, compressor effective degradation, gas turbine fuel stroke ratio, gas turbine speed, gas turbine generator open/close command, gas turbine exhaust temperature, gas turbine trip signal, compressor wheel space temperature, and gas turbine rotor vibration. With specific reference to the CBV 125, empirical data pertinent to the CBV 125 is processed using the valve transfer function model 215 to obtain the second set of one or more potential failure predictors, which is then provided to the valve health status generator 235.

A third set of one or more potential failure predictors is provided to the valve health status generator 235 by using a prediction model 225 to process predictive data. The predictive data can be, for example, data derived from statistical representations, theoretical representations, and/or estimates associated with the gas turbine system 100.

The valve health status generator 235 applies a holistic procedure to the first, second, and third set of one or more potential failure predictors to derive predictive information pertaining to various components of the gas turbine system 100. For example, while the first set of one or more potential failure predictors (derived using the neural network model 205 and based on operational data from the sensors) can be indicative of a catastrophic failure of the CBV 125 within, for instance, a couple of days, the second set of one or more potential failure predictors (derived by the valve transfer function model 215 using historical data) can indicate that the failure may not be catastrophic in nature, and the third set of one or more potential failure predictors derived by the prediction model (using predictive data) may indicate that the catastrophic failure of the CBV 125 may occur, for instance, in a month rather than in a couple of days. The valve health status generator 235 can use a decision tree to evaluate the first, second, and third set of one or more potential failure predictors in a holistic manner and derive the predictive information pertaining to various components of the gas turbine system 100. This predictive information, which constitutes the health status of the gas turbine system 100, is provided to the controller 140 and/or the GUI 145 as described above.

FIG. 3 illustrates some components of the valve health status generator 235 (shown in FIG. 2) in an exemplary implementation in accordance with the disclosure. The valve health status generator 235 accepts the first, second, and third set of one or more potential failure predictors provided by the neural network model 205, the valve transfer function model 215, and the prediction model 225 respectively (each of which is shown in FIG. 2). In this exemplary implementation, the first set of one or more potential failure predictors is represented by limit switch positions 305, the second set of one or more potential failure predictors is represented by a predicted valve opening 310 (for example, as a percentage value), and the third set of one or more potential failure predictors is represented by a probability of occurrence of a failure 315. The holistic procedure referred to above, with respect to the valve health status generator 235, is implemented using a decision tree 320. The predictive information derived by using the decision tree 320, which constitutes the health status of the gas turbine system 100, is provided to the controller 140 and/or the GUI 145 via lines 141 and 142 respectively.

FIG. 4 shows some exemplary components of a valve health assessment system 135 in accordance with another exemplary embodiment of the disclosure. In this exemplary embodiment, the valve health assessment system 135 is embodied in a computer system incorporating a processor 405 that executes computer-executable instructions stored in a memory 430. The processor 405 can be implemented and operated using appropriate hardware, software, firmware, or combinations thereof. Software or firmware implementations can include computer-executable or machine-executable instructions written in any suitable programming language to perform the various functions described. In one embodiment, instructions associated with a function block language can be stored in the memory 430 and executed by the processor 405.

The memory 430 can be used to store program instructions that are loadable and executable by the processor 405, as well as to store data generated during the execution of these programs. Depending on the configuration and type of the computer used, the memory 430 can be volatile (such as random access memory (RAM)) and/or non-volatile (such as read-only memory (ROM), flash memory, etc.). In some embodiments, the memory devices can also include additional removable storage 435 and/or non-removable storage 440 including, but not limited to, magnetic storage, optical disks, and/or tape storage. The disk drives and their associated computer-readable media can provide non-volatile storage of computer-readable instructions, data structures, program modules, and other data for the devices. In some implementations, the memory 430 can include multiple different types of memory, such as static random access memory (SRAM), dynamic random access memory (DRAM), or ROM.

The memory 430, the removable storage 435, and the non-removable storage 440 are all examples of non-transitory computer-readable storage media. For example, non-transitory computer-readable storage media can include volatile and non-volatile, removable and non-removable media implemented in any method or technology for storage of information such as computer-readable instructions, data structures, program modules or other data. Additional types of non-transitory computer storage media that can be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

Valve health assessment system 135 can also include one or more communication connections 410 that can allow a control device (not shown) to communicate with devices or equipment capable of communicating with the valve health assessment system 135. The connections can be established via various data communication channels or ports, such as USB or COM ports to receive cables connecting the control device to various other devices on a network. In one embodiment, the control device can include Ethernet drivers that enable the control device to communicate with other devices on the network. According to various embodiments, communication connections 410 can be established via a wired and/or wireless connection on the network.

The valve health assessment system 135 can also include one or more input devices 415 such as a keyboard, mouse, pen, voice input device, and touch input device, and one or more output devices 420 such as a display, printer, and speakers. The valve health assessment system 135 can further include a GUI I/O 425, a controller output interface 445, and a sensor(s) input interface 450. The GUI I/O 425 can be used to allow an operator to provide input information from the GUI 145 (shown in FIG. 1) to the valve health assessment system 135 and to provide output information from the valve health assessment system 135 to the GUI 145. The controller output interface 445 can be used to provide a health status to the controller 140 (shown in FIG. 1), and the sensor(s) input interface 450 can be used to obtain operational data from the sensors 120 and route the operational data to the neural network model 205.

Turning to the contents of the memory 430, the memory 430 can include, but is not limited to, an operating system (OS) 431 and one or more application programs or services for implementing the features and aspects disclosed herein. Such applications or services can include a valve health assessment system executable 432, empirical data 433, and predictive data 434, each of which can be implemented in the form of software that is accessible to the processor 405. When executed by the processor 405, the valve health assessment system executable 432 can be used in conjunction with the empirical data 433 and/or the predictive data 434 to implement the various functionalities and features described in this disclosure.

References are made herein to block diagrams of systems, methods, and computer program products according to example embodiments of the disclosure. It will be understood that at least some of the blocks of the block diagrams, and combinations of blocks in the block diagrams, respectively, can be implemented at least partially by computer program instructions. These computer program instructions can be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions can also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions can also be loaded onto a computer or other programmable data processing apparatus to cause a series of operational elements to be performed on the computer or other programmable apparatus to produce a computer implemented process such that the instructions that execute on the computer or other programmable apparatus provide elements for implementing the functions specified in the block or blocks.

One or more components of the systems and one or more elements of the methods described herein can be implemented through an application program running on an operating system of a computer. They also can be practiced with other computer system configurations, including handheld devices, multiprocessor systems, microprocessor based, or programmable consumer electronics, mini-computers, mainframe computers, etc.

Application programs that are components of the systems and methods described herein can include routines, programs, components, data structures, etc. that implement certain abstract data types and perform certain tasks or actions. In a distributed computing environment, the application program (in whole or in part) can be located in local memory, or in other storage. In addition, or in the alternative, the application program (in whole or in part) can be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the exemplary embodiments described above. Therefore, it is to be understood that the disclosure is not to be limited to the specific embodiments disclosed and that modifications and other embodiments are intended to be included within the scope of the appended claims.

For example, it is to be understood that though some of the specific embodiments disclosed herein pertain to a compressor bleed valve, the valve health assessment system 135 can be used to assess the health status of various other components of the gas turbine system 100, such as valves, switches, actuators, solenoids, coils, and O-rings. A few examples pertaining to the health status of various types of valves of the gas turbine system 100 can include assessing an integrity, assessing an operation, assessing a seating force, assessing improper stroking, assessing stickiness, assessing contamination and/or assessing positioning. A few examples pertaining to assessing the health status of an actuator of the gas turbine system 100 can include identifying a greasing issue and/or incorrect actuation pressure. A few examples pertaining to the health status of a solenoid of the gas turbine system 100 can include identifying ingress of moisture into a coil, and/or ingress of debris into a screen. A few examples pertaining to the health status of an O-ring of the gas turbine system 100 can include identifying moisture build-up and/or clogging. All such embodiments and variations are encompassed in accordance with the disclosure.

That which is claimed is:

1. A method comprising:
   receiving in a processor, from at least one sensor, operational data associated with at least one component of a gas turbine;
   generating, by the processor, a first failure mode predictor of a compressor bleed valve, based at least in part on the operational data, wherein generating the first failure mode predictor comprises using a model to process the operational data associated with the at least one component of the gas turbine;
   generating, by the processor, a second failure mode predictor of the compressor bleed valve based at least in part on modeling at least one state of the compressor bleed valve under at least one operating condition, wherein generating the second failure mode predictor comprises using a valve transfer function indicative of at least one state of the compressor bleed valve under at least one operating condition;
   generating, by the processor, a third failure mode predictor of the compressor bleed valve based at least in part on a probability of occurrence of at least one failure mode of the compressor bleed valve, wherein generating the third failure mode predictor comprises using a prediction model that is indicative of a probability of occurrence of at least one failure mode of the compressor bleed valve;
   generating, by the processor, a control signal by executing a decision tree procedure that is based at least in part on the first failure mode predictor, the second failure mode predictor, and the third failure mode predictor; and
   transmitting, by the processor, the control signal to a controller, the control signal modifying an operation of at least one component of the gas turbine.

2. The method of claim 1, wherein generating the first failure mode predictor comprises using a neural network model to process the operational data associated with the at least one component of the gas turbine.

3. The method of claim 1, wherein the control signal is further operable to improve a health status of the compressor bleed valve, pre-emptively address a projected failure condition, change an airflow, change an air pressure, or change a timing parameter.

4. The method of claim 3, wherein the projected failure condition comprises a catastrophic failure of the compressor bleed valve, a potential failure of the compressor bleed valve, a partial failure of the compressor bleed valve, or a deteriorated performance of the compressor bleed valve.

5. The method of claim 1, further comprising:
   generating a predicted failure signal based at least in part on the first failure mode predictor, the second failure mode predictor, and the third failure mode predictor; and
   displaying an advisory on the basis of the predicted failure signal to enable an operator to pre-empt a failure or improve a performance of the gas turbine.

* * * * *